United States Patent [19]

Borsuk et al.

[11] 4,373,777
[45] Feb. 15, 1983

[54] CONNECTOR AND CABLE ASSEMBLY

[75] Inventors: Leslie M. Borsuk, Los Alamitos; Patrick G. Corrales, Garden Grove, both of Calif.

[73] Assignee: International Telephone and Telegraph Corporation, New York, N.Y.

[21] Appl. No.: 177,192

[22] Filed: Aug. 11, 1980

[51] Int. Cl.³ .............................................. G02B 7/26
[52] U.S. Cl. .............................. 350/96.20; 350/96.23
[58] Field of Search ............... 350/96.20, 96.21, 96.22, 350/96.23; 174/70 R, 70 S

[56] References Cited

U.S. PATENT DOCUMENTS

| | | | |
|---|---|---|---|
| 3,871,744 | 3/1975 | Bridger et al. | 350/96.21 |
| 3,955,878 | 5/1976 | Nowak | 350/96.23 |
| 3,966,299 | 6/1976 | Osterfield et al. | 350/96.21 |
| 4,184,742 | 1/1980 | Corrales | 350/96.21 |
| 4,312,563 | 1/1982 | Mead | 350/96.2 |

Primary Examiner—David K. Moore

[57] ABSTRACT

A combined fiber optic and electrical connector member is disclosed in which the metallic conductors of a cable coupled to the connector member extend through a hollow sleeve while the optical fibers of the cable are spirally wound around the sleeve in a flex chamber thereby reducing bend radiation losses through the fibers when the connector member is engaged with a mating connector member.

15 Claims, 6 Drawing Figures

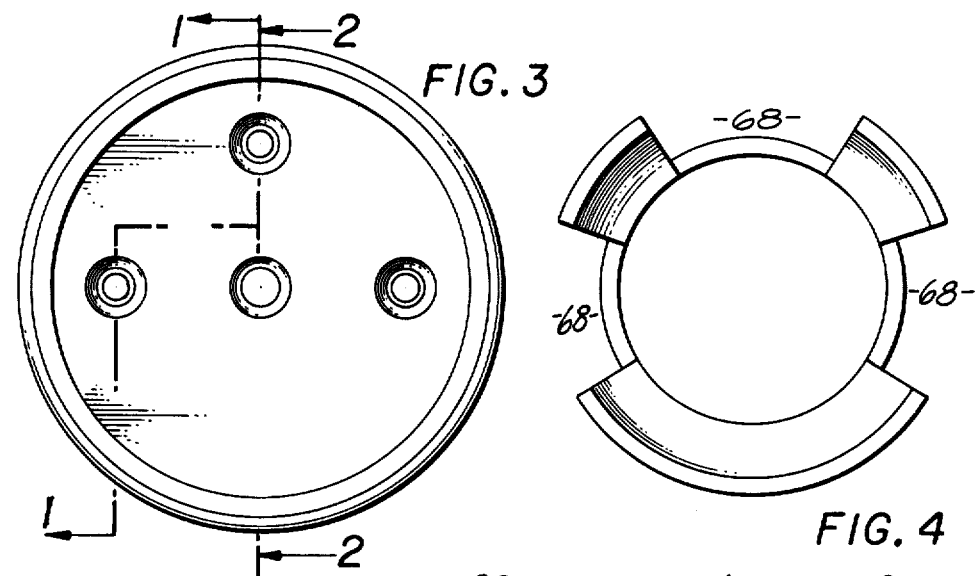
FIG. 3
FIG. 4
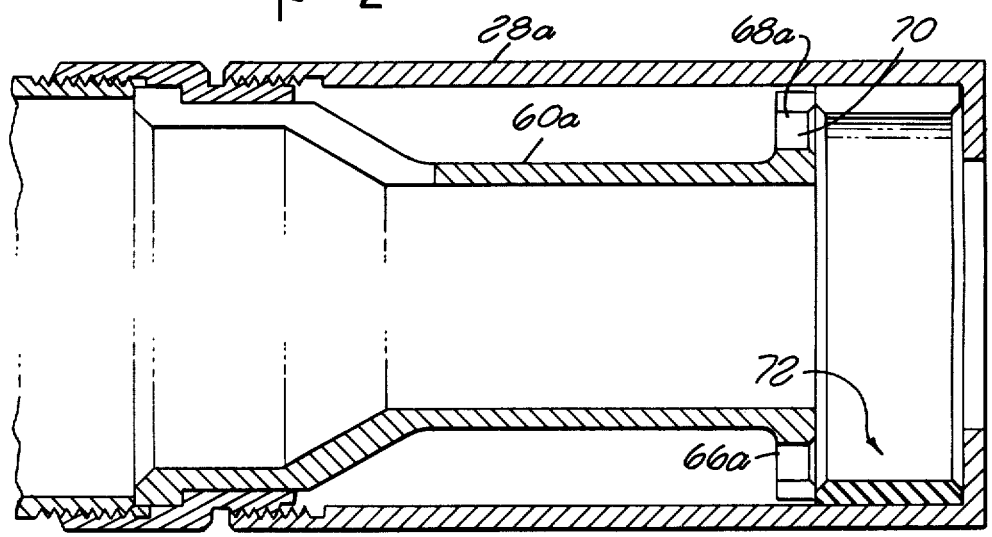
FIG. 5
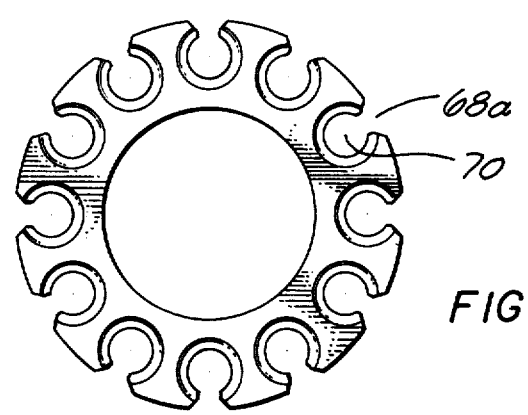
FIG. 6

CONNECTOR AND CABLE ASSEMBLY

BACKGROUND OF THE INVENTION

The present invention relates generally to a connector and, more specifically, to a combined fiber optic and electric connector which is coupled to a cable containing both metallic conductors and optical fibers.

In a typical fiber optic connector member or connector half, the optical fibers of the cable coupled to the connector member are terminated to ferrules which are slidably mounted in a support member in the front of the connector shell. Some form of spring means is provided in the connector member resiliently urging the ferrules forwardly in the support member so that when the connector member is engaged with a mating connector member, the ferrules will be urged rearwardly against the force of the spring means whereby the forward faces of the ferrules in the mating connector members are assured of being maintained in firm abutting relationship. Since the ferrules shift rearwardly when the mating halves of the connector are interengaged, it is necessary to provide in the connector shell a flex chamber which allows the optical fibers to bow or bend. Such a fiber optic connector is disclosed in U.S. Pat. No. 4,184,742 to Corrales. U.S. Pat. Nos. 3,871,744; 3,966,299 and 4,102,561 also disclose fiber optic connectors embodying flex chambers for the optical fibers therein.

Since an optical fiber is a straight column, a flex chamber of substantial length is required in order to allow the fiber to bow to the extent necessary to accommodate rearward shifting of the ferrule in the connector support member yet maintain the bend radius of the bowed fiber sufficiently small to minimize radiation losses through the fiber. As a consequence, excessive connector lengths have been required to preclude high bend losses. If the connector is utilized with a cable containing both metallic conductors and optical fibers, the problem of providing adequate area in the flex chamber for bowing of the fibers is increased due to the metallic conductors which must also pass through the chamber to be terminated to contacts mounted in the support member of the connector. Furthermore, with the flex chamber containing both metallic conductors and optical fibers, there is a risk that the metallic conductors may press against the optical fibers thereby damaging the fibers.

It is therefore an object of the present invention to provide a combined fiber optic and electrical connector in which metallic conductors of the cable connected thereto are prevented from pressing against the optical fibers in the flex chamber, and the fibers are arranged in such a manner to allow controlled buckling thereof in a flex chamber of relatively short axial length.

SUMMARY OF THE INVENTION

According to a principal aspect of the present invention, there is provided a connector and cable assembly in which a cable containing at least one optical fiber and at least one metallic conductor is coupled to a combined first optic and electrical connector member. The connector member comprises a support member and a hollow sleeve behind the support member. The support member contains a plurality of axially extending passages. The metallic conductor in the cable extends through the hollow sleeve and is terminated to a contact in one of the passages in the support member. The optical fiber of the cable is spirally wound around the sleeve and terminated to a ferrule in another passage. The spiral portion of the fiber is free to flex upon rearward movement of the ferrule in the support member in a controlled manner, without interference or over stressing by the metallic conductor, and bend radiation losses are minimized in spite of the fact that the flex chamber for the connector may be relatively short.

BRIEF DESCRIPTION OF THE DRAWINGS

FIG. 3 is a front end view of the connector member illustrated in FIGS. 1 and 2;

FIG. 4 is a front end view of the hollow sleeve utilized in the flex chamber of the connector member illustrated in FIGS. 1 and 2 around which the optical fibers are spirally wound;

FIG. 5 is a longitudinal sectional view of the rear portion of the connector containing modified form of a hollow sleeve, the cable being omitted from this illustration; and FIG. 6 is a rear end view of the sleeve shown in FIG. 5.

DESCRIPTION OF THE PREFERRED EMBODIMENTS

Figure 1:
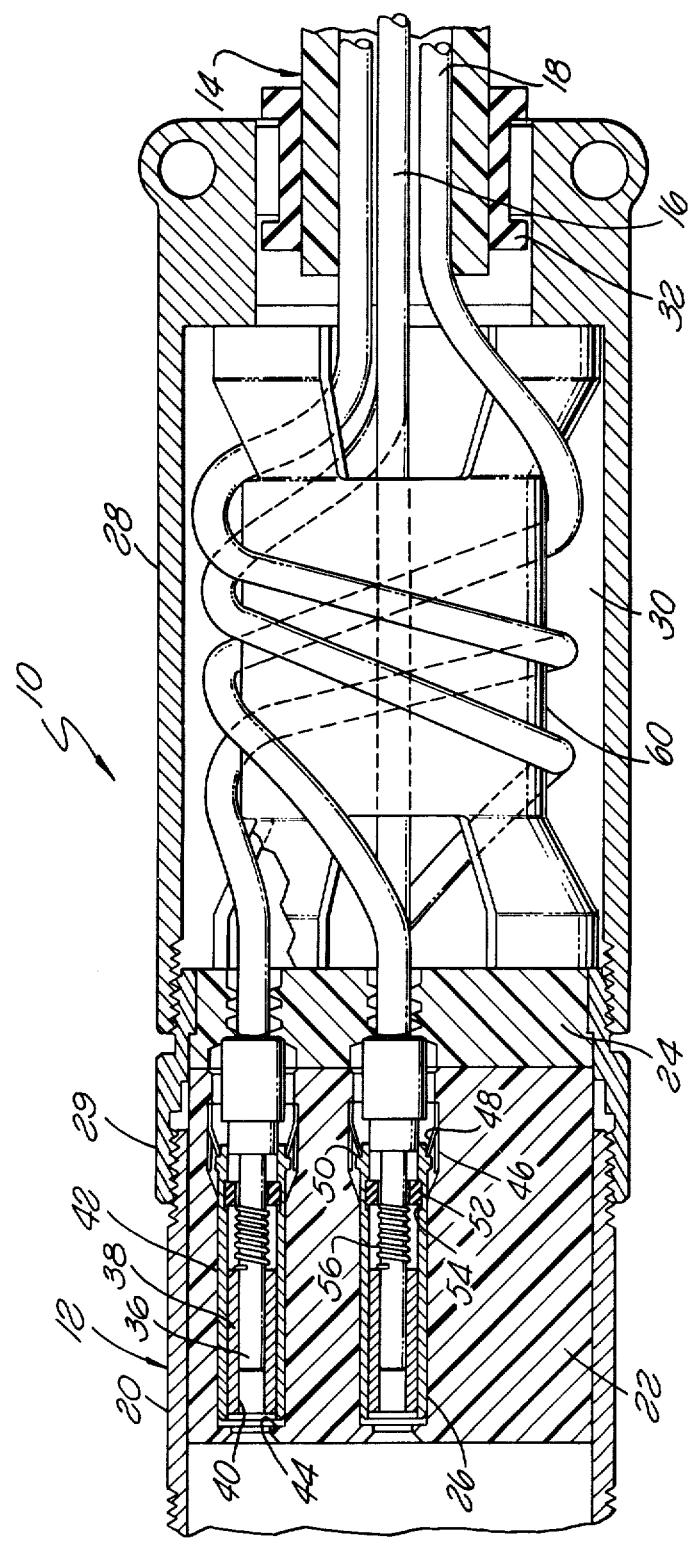
FIG. 1 is a partial, longitudinal sectional view taken along line 1—1 of FIG. 3 illustrating the combined fiber optic and electrical connector member of the present invention coupled to a cable shown as containing a single metallic conductor and three optical fibers.

Reference is now made to FIGS. 1 to 4 of the drawings in detail, which show one embodiment of the connector and cable assembly of the present invention, generally designated 10. The assembly comprises a combined fiber optic and electrical connector member 12 which is coupled to a cable 14 shown in FIG. 1 as containing a single metallic conductor or wire 16 and three optical fibers 18. If desired, the cable may contain a plurality of wires 16 and a smaller or greater number of optical fibers than three.

The forward end of the connector member 12 may be in the form of a standard electrical connector body comprising a shell 20 containing a support member or insulator 22 backed by an elastomeric grommet 24. A plurality of contact passages 26 extend axially through the insulator and grommet. Only four such passages are shown in FIG. 3 which corresponds to the number of wires and optical fibers in the cable 14. Normally, there would be a substantially larger number of contact passages in the insulator 22 to accommodate a larger number of wires and fibers.

A cylindrical end bell 28 is connected to the rear of shell 20 by a threaded adapter ring 29. The end bell provides a flex chamber 30 for the optical fibers of the cable. The cable passes through an elastomeric grommet in an opening in the rear of the end bell. The cable is firmly secured to the rear of the end bell by clamping ring, not shown, the details of which are not necessary for an understanding of the present invention.

Figure 2:
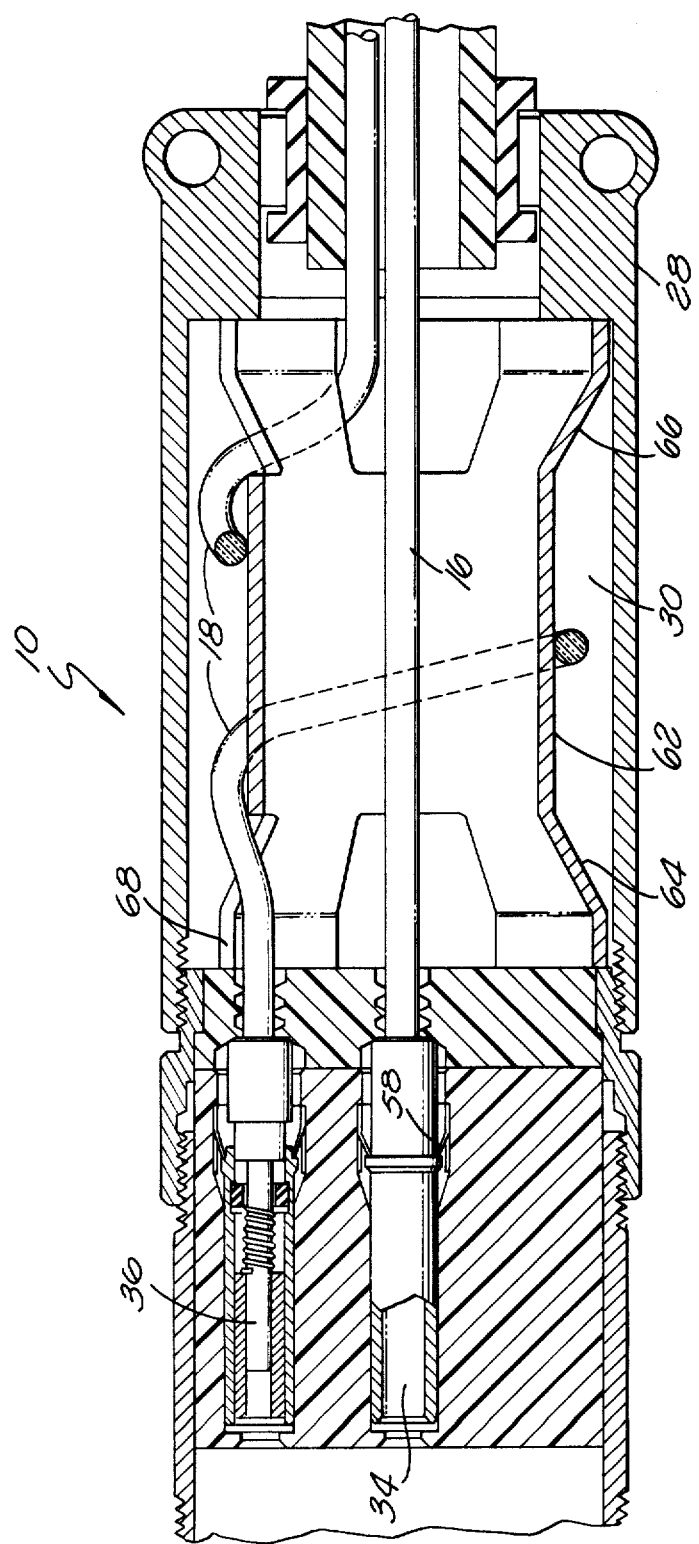
FIG. 2 is a longitudinal sectional view taken along line 2—2 of FIG. 3, but showing only one of the optical fibers in the cable.

The wire 16 of the cable is connected to a conventional metallic socket contact 34 mounted in the center contact passage 26 as seen in FIG. 2. Each of the optical fibers 18 is terminated by a ferrule 36 mounted in one of the other contact passages, namely, those spaced outwardly from the center axis of the connector.

A ferrule alignment sleeve 38 press fit on the forward end of each ferrule 36 extends forwardly thereof providing a channel 40 which is adapted to receive a forwardly projecting ferrule of a mating connector member, not shown, which would abut with the end face of the ferrule 36. A tubular member 42 surrounds the ferrule 36 and sleeve 38 within the contact passage. An inwardly extending annular flange 44 is provided at the forward end of the passage which restricts forward movement of the member 42 therein. A contact retention clip 46 is mounted in the rear portion of the contact passage. The clip embodies spring retention fingers 48 which engage a rearwardly facing annular shoulder 50 on the tubular member 42 thereby releasably retaining the tubular member, and, consequently, the ferrule 36 within the contact passage. A ring 52 is mounted in an annular groove 54 in the tubular member 42 behind the alignment sleeve 38. A coil spring 56 surrounds the ferrule 36 between the sleeve 39 and the ring 52. The coil spring resiliently urges the ferrule 36 and alignment sleeve 38 forwardly in the contact passage. A contact retention clip 58 may also be provided for releasably retaining socket contact 34 in the center contact passage.

In accordance with the invention, a mandrel in the form of a hollow sleeve, generally designated 60, is coaxially mounted in the flex chamber 30 behind the insulator 22. The sleeve embodies a central cylindrical section 62, an outwardly flared forward end portion 64 and an outwardly flared rear end portion 66. The forward and rear end portions of the sleeve slidably engage the interior of the end bell 28. The central section 62 of the sleeve has a diameter somewhat less than that of the end bell thereby defining therebetween the flex chamber 30 which has an annular configuration. Three circumferentially spaced axially extending slots 68 are formed in the flared forward and rear end portions of the sleeve, as best seen in FIG. 4. Any number of slots may be provided in the sleeve depending upon the size and pattern of the ferrules in the insulator.

The wire 16 of cable 14 extends through the interior of the hollow sleeve 60. Preferably the wire is cut to such a length that when the end thereof is terminated to the socket contact 34, and the contact is mounted in the center contact passage of the insulator, the wire will extend straight through the sleeve 60. The optical fibers 18 are left longer than the wire 16 so that each fiber may be threaded outwardly through one of the slots 68 in the flared rear end portion 66 of sleeve 60, helically wound about the central section of the sleeve and threaded inwardly through a slot 68 in the flared forward end portion of the sleeve where it makes connection with one of the ferrules 36. The helical convolutions of each of the three fibers are alternately disposed and in spaced relation to each other as seen in FIG. 1, thus allowing maximum individual flexing or buckling of the fibers when the ferrules 36 shift rearwardly in the contact passages 26 upon enterengagement with the mating connector member, not shown. The helical winding of the fibers in the flex chamber of the connector of the present invention allows a controlled buckling of the fibers thereby reducing bend radiation losses to an acceptable level, even though the flex chamber is relatively short in the axial direction. The sleeve 60 further confines the electrical wire 16 so that it will not press against the optical fibers in the flex chamber. In addition, because of the helical configuration of the optical fibers in the flex chamber, if it becomes necessary to make a second termination of a ferrule to a fiber because the end face of the ferrule is damaged, for example, adequate length of the fiber will remain to permit such second termination to be made, thus avoiding terminating all the fibers and the electrical wire in the cable a second time.

It will be noted that U.S. Pat. No. 3,955,878 discloses a fiber optic submarine cable in which the optical fibers therein are helically formed and are supported by a gelantinous substance to minimize stresses on the fibers when the cable is subjected to axial loads. Thus, the fibers are free to elongate if the cable is bent or is placed under tension. However, this patent is not concerned with bend radiation losses in a fiber optic connector as is the present invention.

Occasionally, during the process of terminating ferrules to the optical fibers in the assembly of the present invention, the fibers will end up having different lengths. Thus, when the fibers are helically wound about the sleeve in the flex chamber, some of the fibers may bunch up so that they are no longer uniformly wound in alternate spaced relation around the sleeve. To overcome this problem, a sleeve 60a as shown in FIGS. 5 and 6 may be utilized. In this embodiment, the rear portion 66a of the sleeve is in the form of an annular outwardly extending flange. A plurality of radially extending slots 68a are formed in the flange, the number of which exceeds the number of fibers in the cable. Enlarged cylindrical bores 70 are formed at the inner ends of the slots. A longitudinally split spacer ring 72 is mounted in the end bell 28a behind the sleeve 60a. By this arrangement, if one or more of the fibers after termination to the ferrules are longer than the other fibers, the longer fibers may be foreshortened by shifting them circumferentially around the flange 66a from the position they would normally assume to a new slot into which they may be pushed and retained. This will ensure that the fibers will be firmly and uniformly helically wound about the central portion of the sleeve 60a so that they will undergo controlled buckling when the connector halves are mated.

What is claimed is:

1. A connector and cable assembly comprising:
   a combined fiber optic and electrical connector member and a cable containing at least one optical fiber and at least one metallic conductor;
   said connector member comprising a support member and a hollow sleeve behind said support member;
   said support member containing a plurality of axially extending passages therethrough;
   said cable being connected to the rear of said connector member with said metallic conductor extending through said sleeve and terminated to a contact in one of said passages; and
   said optical fiber being spirally wound around said sleeve and terminated to a ferrule slidably mounted in another of said passages, said ferrule being adapted for rearward movement in said other passage, the spiral portion of said fiber being free to flex upon rearward movement of said ferrule in said support member.

2. An assembly as set forth in claim 1 wherein:
said fiber is in the form of a helix around said sleeve.

3. An assembly as set forth in claim 1 wherein:

said cable contains a plurality of said fibers each terminated to a ferrule slidably mounted in said support and formed as a helix around said sleeve; and said helical portions of said fibers around said sleeve being alternately disposed and in spaced relation to each other.

4. An assembly as set forth in claim 1 wherein:

a shell surrounds said sleeve in spaced relation to a portion thereof defining a flex chamber of sufficient area to allow said spiral portion of said fiber to expand upon rearward movement of said ferrule in said support member.

5. An assembly as set forth in claim 1 wherein:

said sleeve embodies forward and rear end portions each having a slot therein through which said fiber is threaded.

6. An assembly as set forth in claim 5 wherein:

each of said end portions contains a plurality of said slots spaced circumferentially from each other; and said cable contains a plurality of said fibers each threaded through corresponding slots in said end portions of said sleeve.

7. An assembly as set forth in claim 5 wherein:

said sleeve embodies a central cylindrical portion between said end portions;

said end portions of said sleeve are flared outwardly;

said sleeve is mounted in a cylindrical shell with said flared end portions thereof slidably engaging the interior of said shell; and said fiber is threaded through the rear of said shell outwardly through the slot in said rear flared end portion of said sleeve, wound as a helix around said central cylindrical portion and threaded inwardly through said slot in said forward flared end portion of said sleeve.

8. An assembly as set forth in claim 6 wherein:

said rear end portion of said sleeve contains a number of slots greater than that of said fibers.

9. An assembly as set forth in claim 8 wherein:

said rear end portion comprises an annular outwardly extending flange and said slots open at the periphery of said flange whereby said fibers may be shifted circumferentially from one slot to another.

10. A fiber optic connector and cable assembly comprising:

a fiber optic connector member and a cable containing at least one optical fiber;

said connector member comprising a support member having a mandrel therebehind;

said support member containing at least one axially extending passage therethrough;

a fiber optic ferrule slidably mounted in said passage and adapted for rearward movement therein from a forward position;

said cable being connected to the rear of said connector member; and said optical fiber being wound around said mandrel and terminated to said ferrule, the wound portion of said fiber being free to flex upon rearward movement of said ferrule in said support member.

11. An assembly as set forth in claim 10 wherein:

said fiber is in the form of a helix around said mandrel.

12. An assembly as set forth in claim 10 wherein:

said cable contains a plurality of said fibers each terminated to a ferrule slidably mounted in said support and formed as a helix around said element; and said helical portions of said fibers around said element being alternately disposed and in spaced relation to each other.

13. An assembly as set forth in claim 10 wherein:

a shell surrounds said mandrel in spaced relation to a portion thereof defining a flex chamber of sufficient area to allow said wound portion of said fiber to expand upon rearward movement of said ferrule in said support member.

14. An assembly as set forth in claim 10 wherein:

said fiber is spirally wound around said mandrel.

15. An assembly as set forth in claim 10 wherein:

sufficient length of said fiber is wound around said mandrel to permit said ferrule to be separated from said fiber and replaced by a second ferrule which may be mounted in said forward position in said passage.

* * * * *